US007347386B2

(12) United States Patent
Chen

(10) Patent No.: US 7,347,386 B2
(45) Date of Patent: *Mar. 25, 2008

(54) SPRAYER WITH CHANGEABLE VOLUME

(76) Inventor: Chiang-Pei Chen, 3F, No. 80, Yiping Road, Taiping City, Taichung Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/461,682

(22) Filed: Aug. 1, 2006

(65) Prior Publication Data

US 2007/0017507 A1 Jan. 25, 2007

Related U.S. Application Data

(63) Continuation of application No. 11/161,027, filed on Jul. 20, 2005, now Pat. No. 7,118,050.

(51) Int. Cl.

| | |
|---|---|
| ***B05B 9/043*** | (2006.01) |
| ***B05B 11/04*** | (2006.01) |
| ***A01G 25/14*** | (2006.01) |
| ***B65D 37/00*** | (2006.01) |

(52) U.S. Cl. ...................... 239/328; 239/329; 239/332; 239/375; 222/92; 222/143

(58) Field of Classification Search ................ 239/328, 239/329, 332, 375, 302, 330; 222/92, 143, 222/93–95, 333; 220/666, 669–671

See application file for complete search history.

(56) References Cited

U.S. PATENT DOCUMENTS

| | | | | |
|---|---|---|---|---|
| 3,726,443 | A | 4/1973 | Harris | 222/333 |
| 4,592,492 | A | 6/1986 | Tidmore | 222/209 |
| 5,607,082 | A | 3/1997 | Cracauer | 222/95 |
| 5,636,791 | A | 6/1997 | Leer | 239/142 |
| 5,667,101 | A | 9/1997 | Barrash et al. | 222/92 |
| 5,752,661 | A | 5/1998 | Lewis | 239/153 |
| 6,220,526 | B1 | 4/2001 | Johnson | 239/323 |
| 6,431,406 | B1 | 8/2002 | Pruett | 222/210 |
| 6,641,002 | B2 | 11/2003 | Gerenraich et al. | 222/333 |
| 6,651,907 | B2 | 11/2003 | Rodd | 239/332 |
| 6,763,973 | B1 | 7/2004 | Hudkins | 222/1 |
| 6,981,613 | B1 | 1/2006 | Kamisugl | 222/105 |
| 2002/0113101 | A1 | 8/2002 | Skillern | 224/148.2 |
| 2006/0027680 | A1 | 2/2006 | Wu | 239/302 |

*Primary Examiner*—Darren Gorman

(74) *Attorney, Agent, or Firm*—Alan Kamrath; Kamrath & Associates PA

(57) ABSTRACT

A sprayer with a changeable volume includes a container, a pump, a first pipe, a second pipe and a nozzle. The container includes an upper wall and a lower wall. The upper wall can be compressed while not containing water and extensible for containing water. The lower wall is connected to the upper wall. The pump is put in a space defined in the lower wall. The first pipe is led to the pump from a space defined in the upper wall. The second pipe is led to the exterior of the container from the pump. The nozzle is connected to the second pipe.

7 Claims, 10 Drawing Sheets

3 - 3

3 - 3

7 - 7

SPRAYER WITH CHANGEABLE VOLUME

CROSS-REFERENCE

This application is a continuation of U.S. patent application Ser. No. 11/161,027 filed on Jul. 20, 2005, now U.S. Pat. No. 7,118,650.

BACKGROUND OF INVENTION

1. Field of Invention

The present invention relates to a sprayer and, more particularly, to a sprayer with a changeable volume.

2. Related Prior Art

Referring to FIGS. 9 and 10, a conventional sprayer includes a container 60 formed with a handle 63. The container 60 includes a first space 61, a second space 62 communicated with the first space 61 through a channel (not numbered) and a port 621 communicated with the second space 62. Water can be filled in and poured from the second space 62 through the port 621. The port 621 can be closed of a cap 90. A pump 70 is put in the first space 61. A pipe (not numbered) is led into the second space 62 from the pump 70 through the channel. Then, the channel is sealed. An outlet device 80 includes a pipe 81 connected to the pump 70, a nozzle 83 connected to the pipe 81 and a handle 82 operatively connected to the nozzle 83. In use, water is filled in the container 60 and then sprayed from the nozzle 83. After use, water is poured from the container 60. Being made of a thermosetting plastic, the container 60 occupies a large space although not containing any water. This wastes space and causes inconvenience for shipment and storage. This entails a high cost in shipment.

The present invention is therefore intended to obviate or at least alleviate the problems encountered in the prior art.

SUMMARY OF INVENTION

According to the present invention, there is disclosed a sprayer with a changeable volume. The sprayer includes a container, a pump, a first pipe, a second pipe and a nozzle. The container includes an upper wall and a lower wall. The upper wall can be compressed while not containing water and extensible for containing water. The lower wall is connected to the upper wall. The pump is put in a space defined in the lower wall. The first pipe is led to the pump from a space defined in the upper wall. The second pipe is led to the exterior of the container from the pump. The nozzle is connected to the second pipe.

An advantage of the sprayer according to the present invention is the convenience in shipment and storage of the sprayer, because the upper wall can be compressed and can occupy a small space.

Other advantages and novel features of the invention will become more apparent from the following detailed description in conjunction with the drawings.

BRIEF DESCRIPTION OF DRAWINGS

The present invention will be described through detailed description of two embodiments referring to the drawings.

DETAILED DESCRIPTION OF EMBODIMENTS

Referring to FIGS. 1 through 5, there is shown a sprayer with a changeable volume according to a first embodiment of the present invention. The sprayer includes a container 10 and a pump 20.

Figure 1:
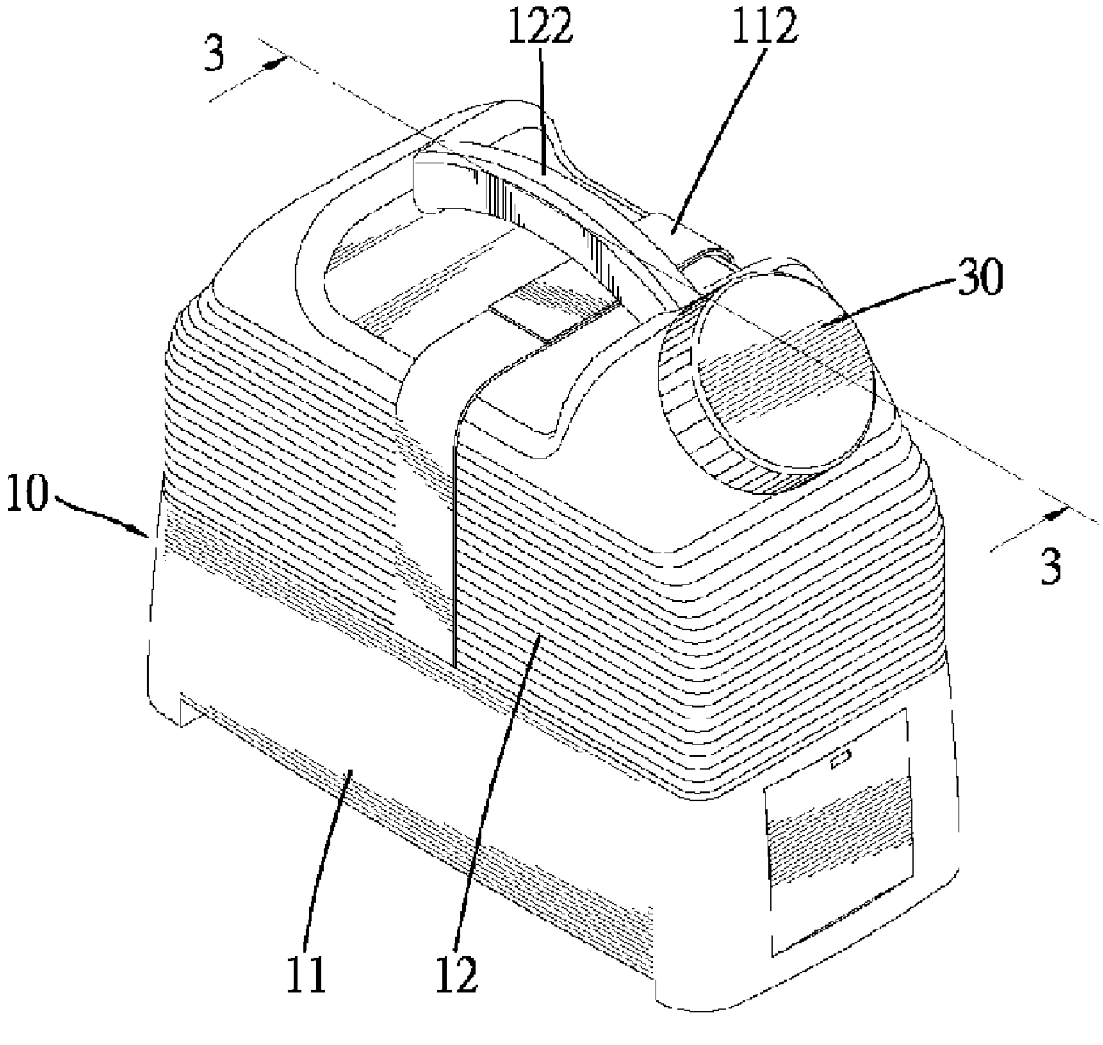
FIG. 1 is a perspective view of a sprayer with a changeable volume according to the first embodiment of the present invention.
Figure 2:
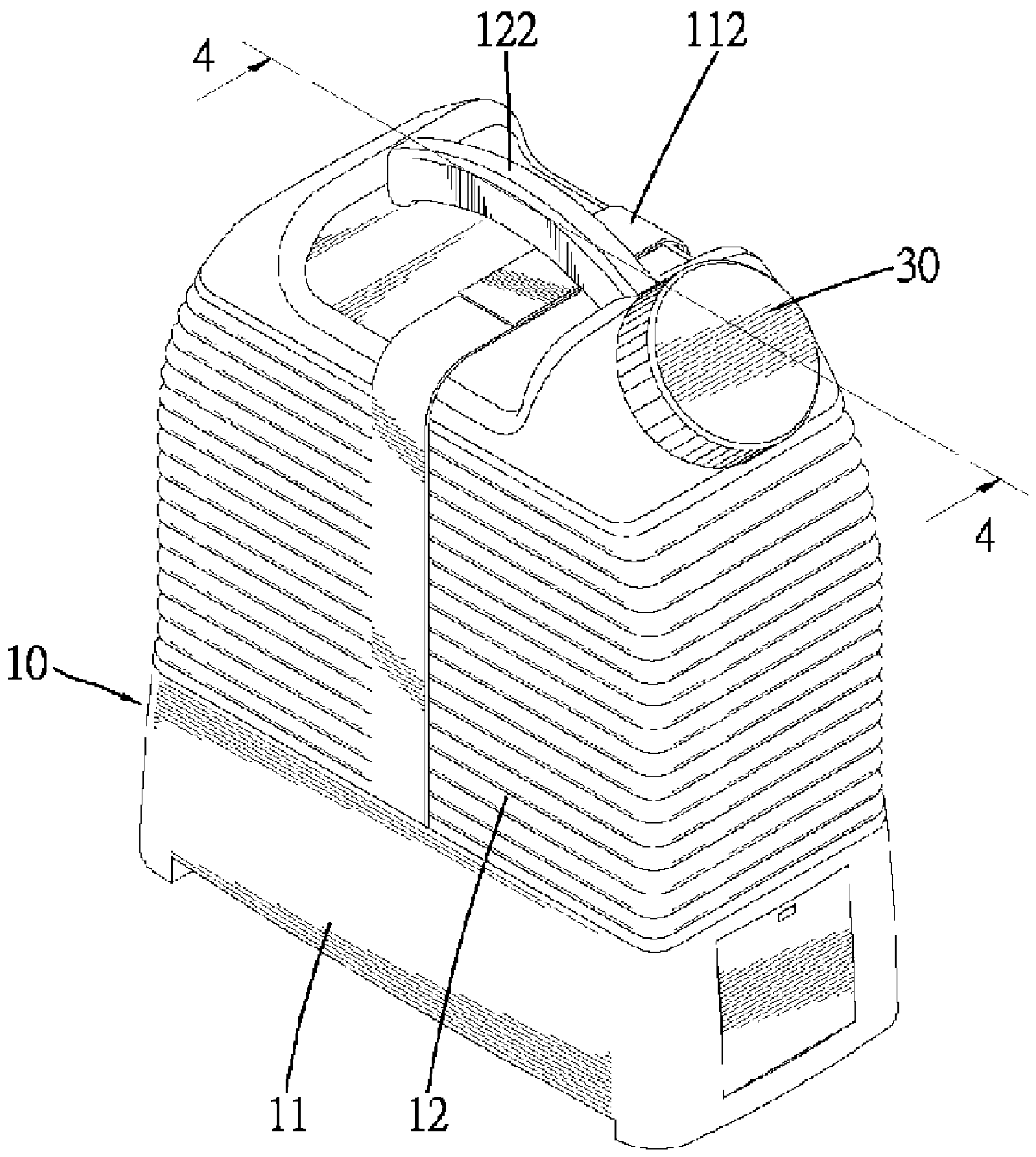
FIG. 2 is another perspective view of the sprayer of FIG. 1, showing the sprayer extended.
Figure 3:
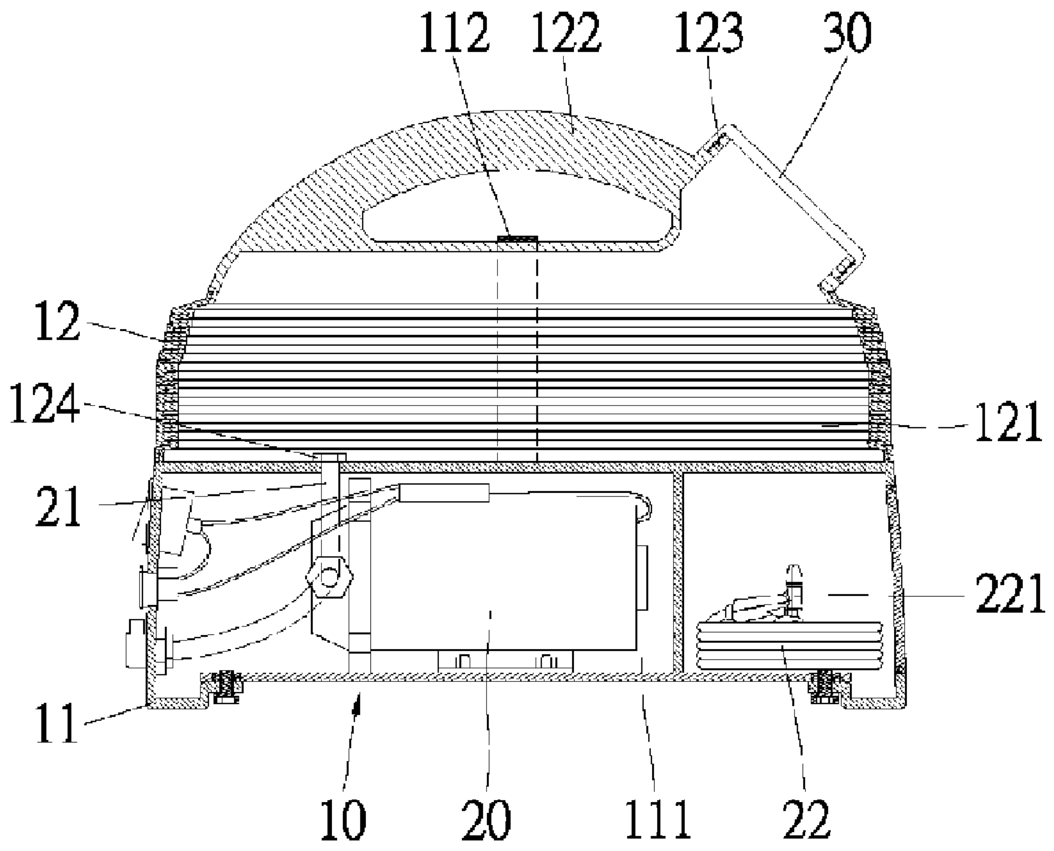
FIG. 3 is a cross-sectional view taken along a line 3-3 in FIG. 1.
Figure 4:
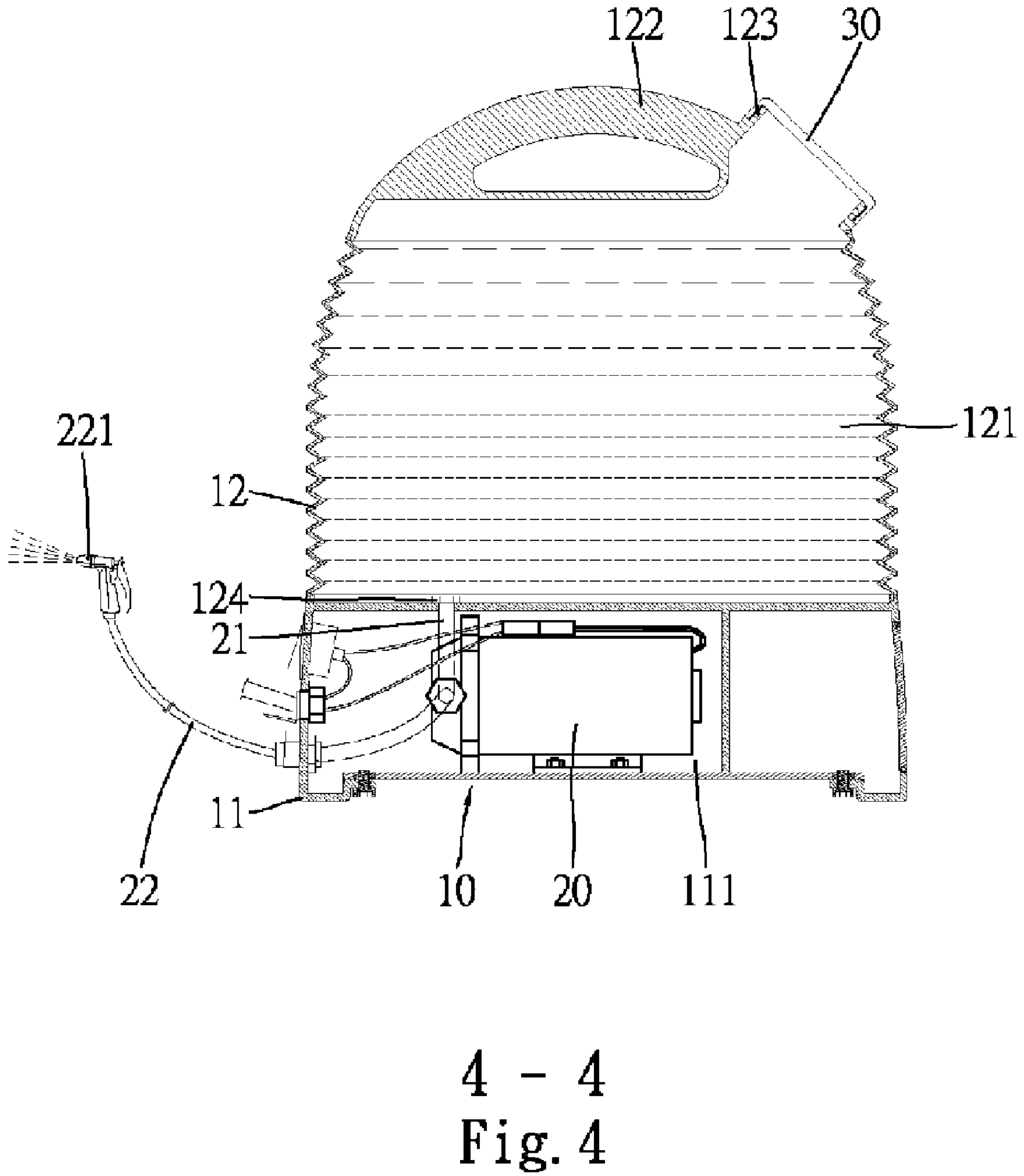
FIG. 4 is a cross-sectional view taken along a line 4-4 in FIG. 2.

Referring to FIGS. 3 and 4, the container 10 includes a bottom portion (not numbered), a lower wall 11 formed on the bottom portion, an upper wall 12 formed on the lower wall 11, a top portion (not numbered) formed on the upper wall 12, and a handle 122 formed on the top portion.

The lower wall 11 includes a rigid structure, and defines a space 111 for containing the pump 20.

The upper wall 12 includes a pleated structure, and defines a space 121 for containing water. The volume of the space 121 is changeable because of the pleated structure of the upper wall 12. A strap 112 includes two ends connected to the lower wall 11 in order to restrain the upper wall 12.

Water can be filled in and poured from the space 121 through a port 123 defined in the top portion. The port 123 can be closed of a cover 30.

A first pipe 21 is led to the pump 20 from an inlet 124 in the space 121. A second pipe 22 is led to the exterior of the container 10 from the pump 20. A nozzle 221 is connected to the second pipe 22.

Referring to FIG. 3, with the pleated structure, the upper wall 12 is compressed and occupies a small space while not containing any water. This saves space and causes convenience for shipment and storage. This involves a low cost in shipment. The second pipe 22 is withdrawn.

Referring to FIG. 4, with the pleated structure, the upper wall 12 is extended and provides a large space for containing water. The second pipe 22 is extended.

Figure 5:
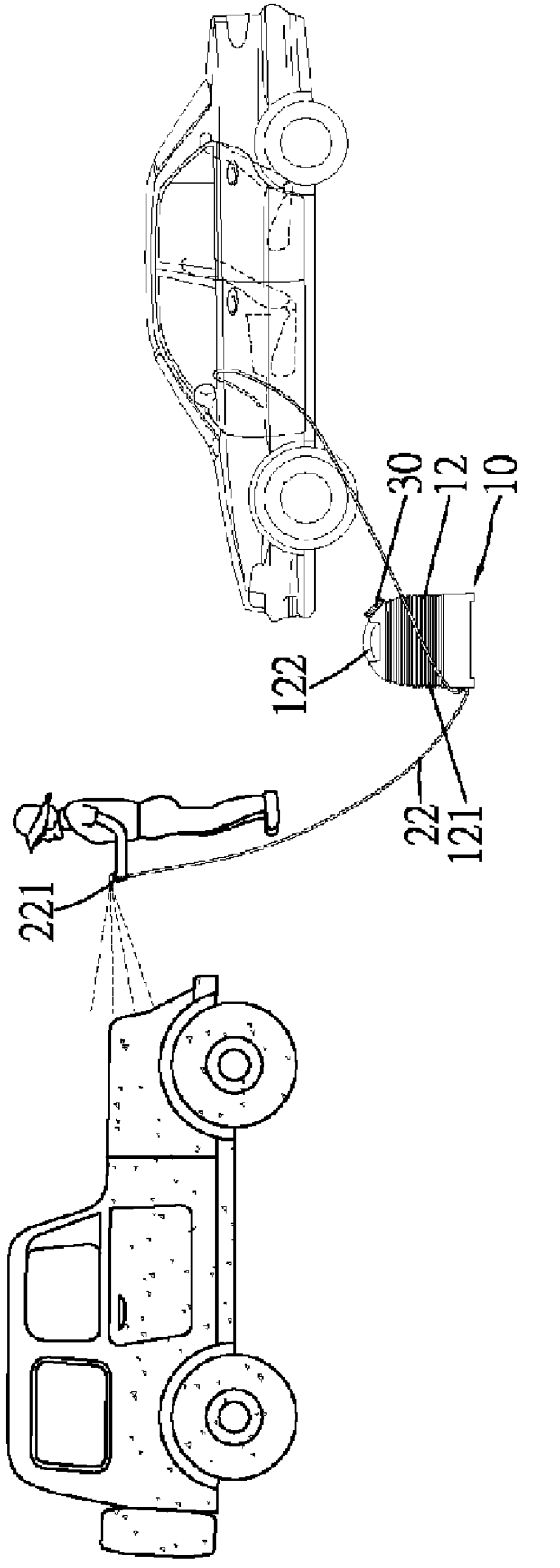
FIG. 5 is a side view of the sprayer shown in FIG. 1, showing the sprayer in use.

Referring to FIG. 5, the sprayer can be used in washing cars.

Figure 6:
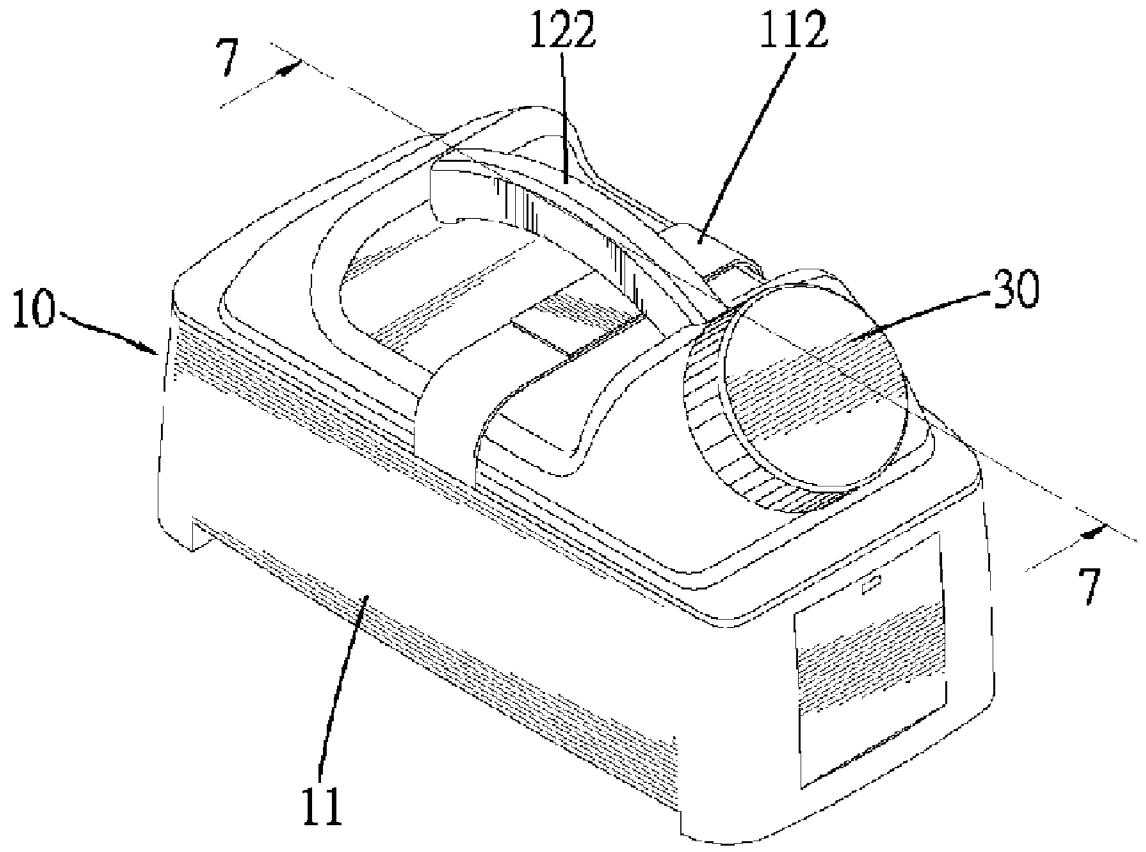
FIG. 6 is a perspective view of a sprayer with a changeable volume according to the second embodiment of the present invention.
Figure 7:
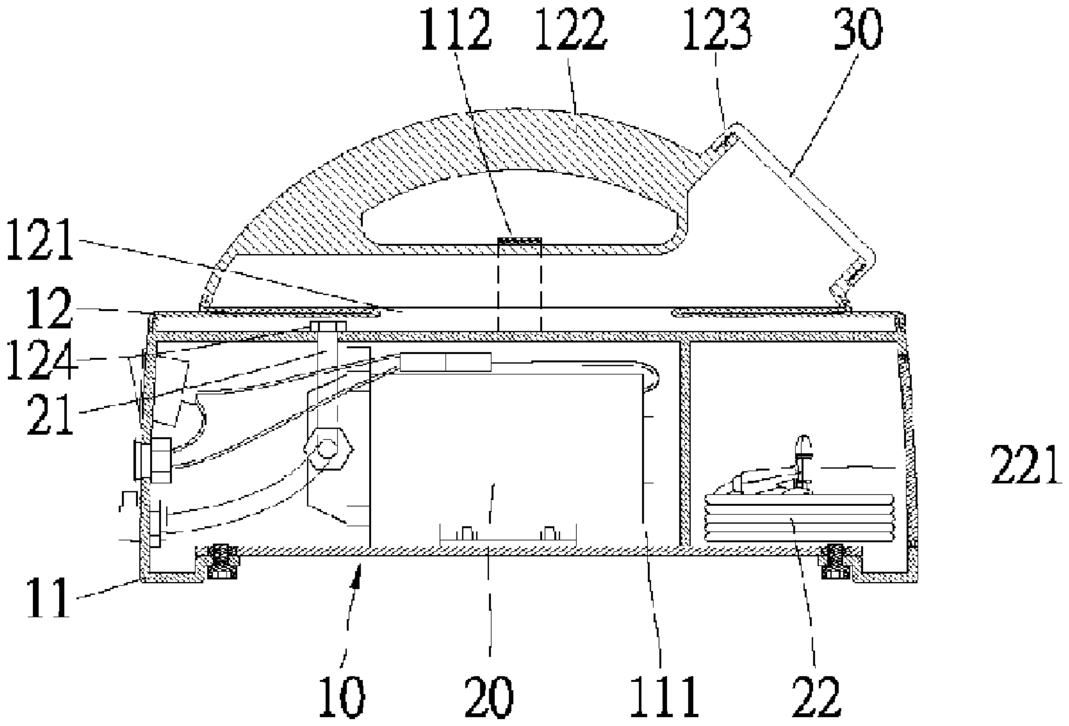
FIG. 7 is a cross-sectional view taken along a line 7-7 in FIG. 6.
Figure 8:
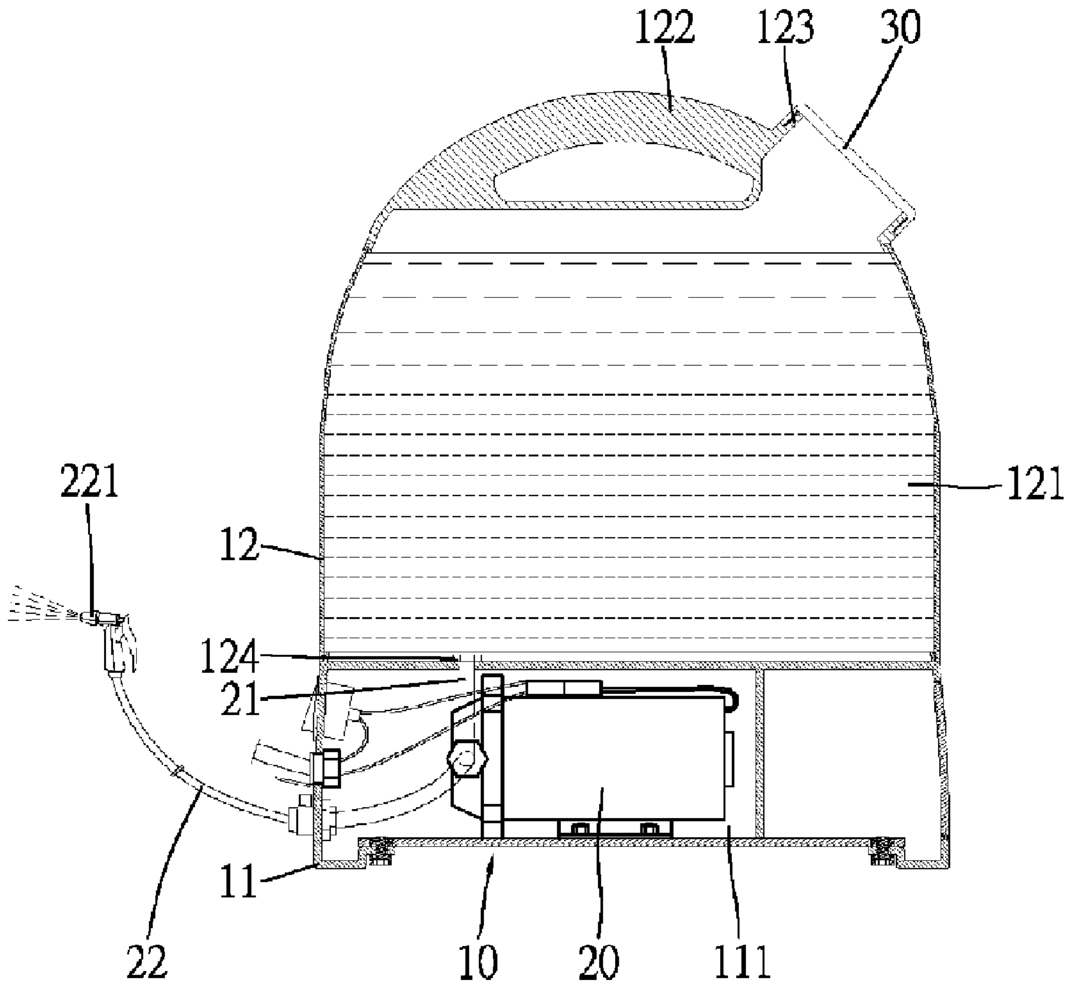
FIG. 8 is similar to FIG. 7 but shows the sprayer extended.
Figure 9:
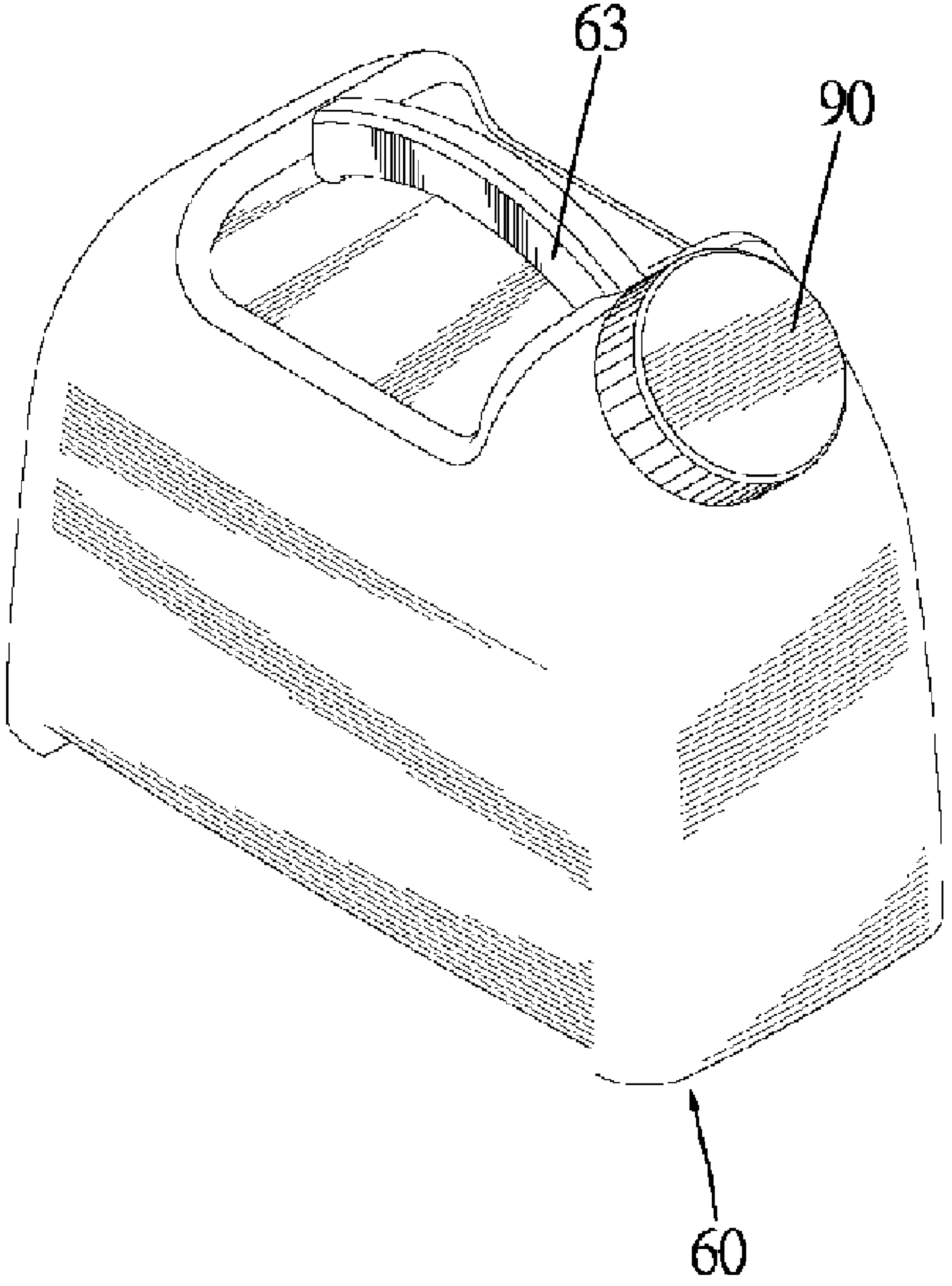
Fig. 9 PRIOR ART
FIG. 9 is a perspective view of a conventional sprayer.
Figure 10:
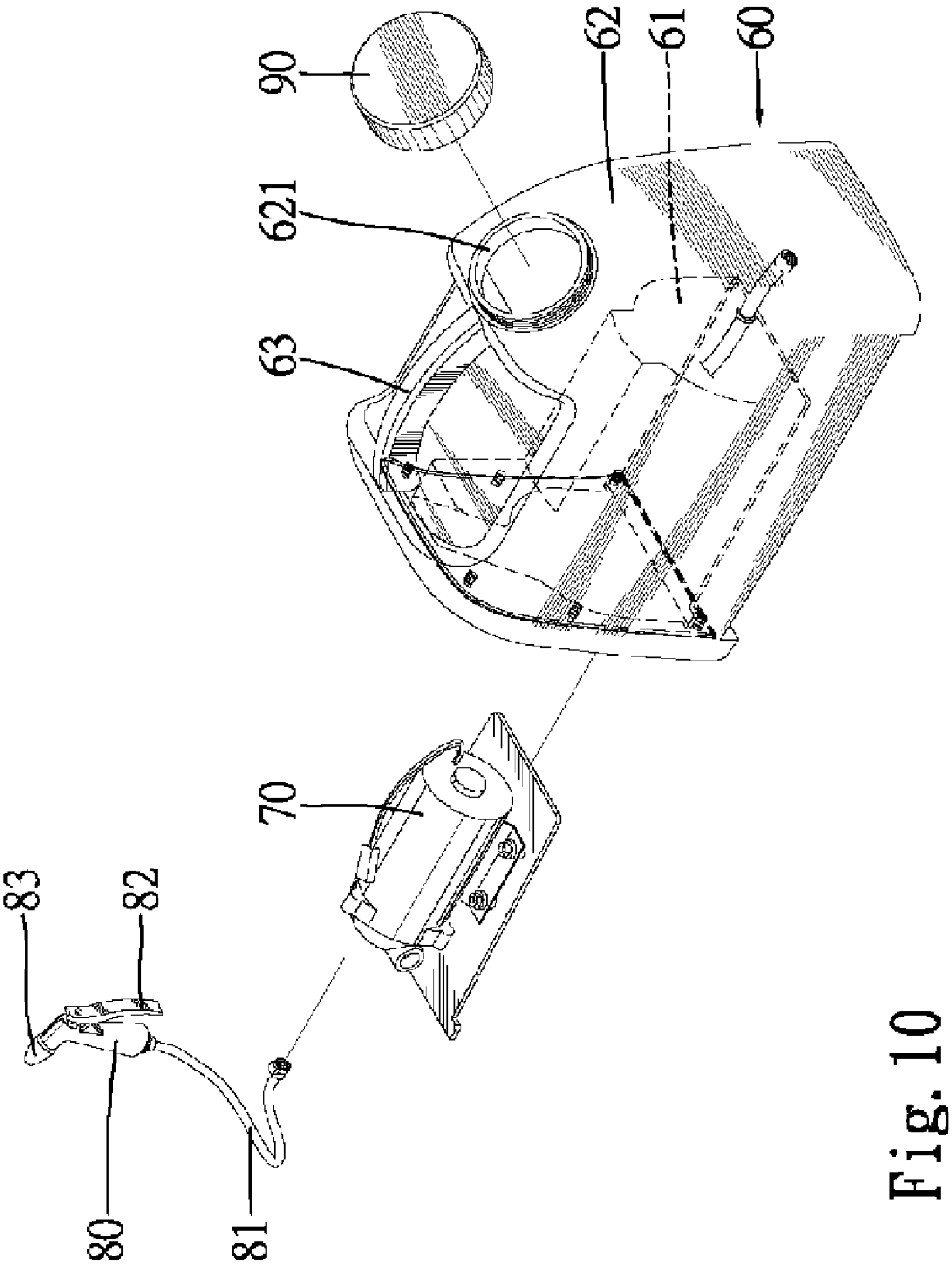
Fig. 10 PRIOR ART
FIG. 10 is an exploded view of the sprayer shown in FIG. 9.

FIGS. 6 through 8, there is shown a sprayer according to a second embodiment of the present invention. The second embodiment is similar to the first embodiment except that the upper wall 12 includes an inflatable structure instead of the pleated structure. To this end, the upper wall 12 can be made of any proper material such as that of a tube of a tire.

Referring to FIG. 7, with the inflatable structure, the upper wall 12 is compressed and occupies a small space while not containing any water. The upper wall 12 is thick.

Referring to FIG. 8, with the inflatable structure, the upper wall 12 is extended and provides a large space for containing water. The upper wall 12 becomes thin.

The present invention has been described through the detailed description of the embodiments. Those skilled in the art can derive variations from the embodiments without departing from the scope of the present invention. Therefore, the embodiments shall not limit the scope of the present invention defined in the claims.

What is claimed is:

1. A sprayer with a changeable volume comprising:

a container comprising:

a lower circumferential wall formed as a rigid structure, with the lower circumferential wall including an upper circumferential end section and defining a lower space;

an upper circumferential wall circumferentially connected to the upper circumferential end section of the lower circumferential wall and extending from the lower circumferential wall in a vertical direction for a height to define an upper space for containing water, with the height of the upper circumferential wall being extensible and compressible generally parallel to the vertical direction, wherein the upper circumferential wall is extensible generally parallel to the vertical direction between a contracted position, a plurality of intermediate positions and an expanded position, wherein the volume of the upper space is changeable between the contracted position, the plurality of intermediate positions and the expanded position; and a strap restraining the upper circumferential wall against the lower circumferential wall, wherein the strap is extendable between the contracted position, the plurality of intermediate positions and the expanded position for restraining the upper circumferential wall;

a pump positioned in the lower space;

a first pipe led to the pump to supply water thereto;

a second pipe led to the exterior of the container from the pump; and a nozzle connected to the second pipe.

2. The sprayer according to claim 1 wherein the upper circumferential wall comprises a pleated structure.

3. The sprayer according to claim 1 wherein the upper circumferential wall comprises an inflatable structure.

4. The sprayer according to claim 1 wherein the container further comprises a handle formed on the upper circumferential wall.

5. The sprayer according to claim 1 wherein the container further comprises a port for water.

6. The sprayer according to claim 5 further comprising a cover for closing the port for water.

7. The sprayer according to claim 1 wherein the lower circumferential wall has a height in a vertical direction and the height of the lower circumferential wall does not change while the upper circumferential wall is being extended, with the pump positioned in the lower space being protected by the lower circumferential wall.

* * * * *